May 13, 1941.                C. WEIDAUER                2,242,097
                              PINKING MACHINE
                           Filed May 9, 1939          5 Sheets-Sheet 1

CURTIS WEIDAUER,
INVENTOR
BY Ely Pattison
ATTORNEYS.

May 13, 1941.　　　C. WEIDAUER　　　2,242,097
PINKING MACHINE
Filed May 9, 1939　　　5 Sheets-Sheet 2

May 13, 1941.     C. WEIDAUER     2,242,097
PINKING MACHINE
Filed May 9, 1939     5 Sheets-Sheet 3

CURTIS WEIDAUER
INVENTOR
BY Ely Pattison
ATTORNEYS.

May 13, 1941.  C. WEIDAUER  2,242,097
PINKING MACHINE
Filed May 9, 1939  5 Sheets-Sheet 4

May 13, 1941.　　　C. WEIDAUER　　　2,242,097
PINKING MACHINE
Filed May 9, 1939　　　5 Sheets-Sheet 5

CURTIS WEIDAUER.
INVENTOR

ATTORNEYS.

Patented May 13, 1941

2,242,097

UNITED STATES PATENT OFFICE 2,242,097

PINKING MACHINE

Curtis Weidauer, Manhasset, N. Y., assignor to Samuel Briskman, New York, N. Y.

Application May 9, 1939, Serial No. 272,543

8 Claims. (Cl. 164—48)

This invention relates to machines for cutting materials such for example as cloth, skins and other sheet-like materials and more particularly it pertains to machines for cutting zig-zag or serrated edges upon such materials and generally known in the art as, "pinking."

It is the object of the present invention to improve the construction and mode of operation of pinking machines and to provide such machines with mechanisms which will effect a better pinking operation than prior machines.

A feature of the invention resides in a novel continuously operated cutting mechanism whereby the operating speed of the machine is materially increased over that of prior machines.

Another feature of the invention resides in a novel construction and arrangement of parts whereby the length of cut of the cutting mechanism may be varied, thereby rendering the machine capable, within certain limitations, of cutting serrations of various lengths.

Hereinafter it is to be understood that the length of the serrations is measured on the material cut along a longitudinal axis which is the same as the longitudinal axis of the head 14 of the machine.

Still another feature of the invention resides in the provision of a novel feeding mechanism by which the material operated upon is fed through the machine in a continuous intermittent manner.

A further feature of the invention resides in a novel operating means for the feeding mechanism which permits of adjustment of the feeding mechanism according to the length of cut of the cutting mechanism.

A machine of the type herein illustrated, while useful for pinking edges of materials of various types, particularly lends itself to the pinking of edges of fur skins and a further feature of the present invention resides in a novel mechanism for retaining the hair of a skin being operated upon out of the cutting zone of the cutting mechanism and also for conveying from the cutting zone, the pieces of material which have been severed by the cutting mechanism.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the accompanying drawings which illustrate one embodiment of the invention, the reference character 12 designates a work supporting table, bench or the like which has an opening 13 therein. The head 14 of the machine is removably secured as at 15 to a suitable base plate 16 and this base plate may be mounted upon the work supporting table or bench 12 in a conventional manner. The base plate is preferably hinged to the work supporting table or bench and is positioned thereon in such a manner as to close the opening 13.

The head 14 is of substantially hollow construction and extending longitudinally thereof, there is a power shaft 17. Near its forward end the power shaft 17 is supported in a suitable bearing structure 18 herein illustrated as integral with the head. At a point near its opposite end, the power shaft 17 is supported in a bearing 19 carried by a removable bearing plate 20. Upon its forward end, the head 14 is provided with a housing 21 which is closed by a plate 22 which has an opening 23 therein which in turn is closed by a cover plate 24 preferably pivotally mounted upon the plate 22. This housing 21 provides an enclosure for the major portion of the operating mechanism of the material holding and feeding mechanism which latter will be hereinafter more specifically described.

The opposite, or rear end of the power shaft 17, is extended beyond the bearing plate 20 and said extended end carries a driving pulley 25 and a fly or balance wheel 26. The driving pulley 25 is driven by a belt 27 which in turn may be driven by any suitable source of power, not shown. By this construction and arrangement of parts, it is obvious that the power shaft 17 may be rotated by the driving pulley 25 and the belt 27.

Extending from the base plate, there are two bearing lugs 30 which provide means for mounting and supporting a shaft 31. This shaft, during operation of the machine, is adapted to receive an oscillatory motion and this motion is imparted to the shaft 31 by a link 33 which in turn is operated by a crank 34 in the power shaft 17. The link 33 is pivotally connected as at 33' to a lever 32' which is pivotally mounted upon a boss or stub shaft 34'. The lever heretofore mentioned has an arm 32 which is slotted or forked as at 35' to receive a pin 36' eccentrically carried by a disk or the like 37' secured to the end of the shaft 31. By this construction as the power shaft 17 is operated through the rocking of the lever 32', the arm 32 thereof will effect an oscillatory movement of the shaft 31.

As previously stated, the housing 21 encloses the operating mechanism of the material holding and feeding mechanism and these features of the invention will now be described.

Figure 3:
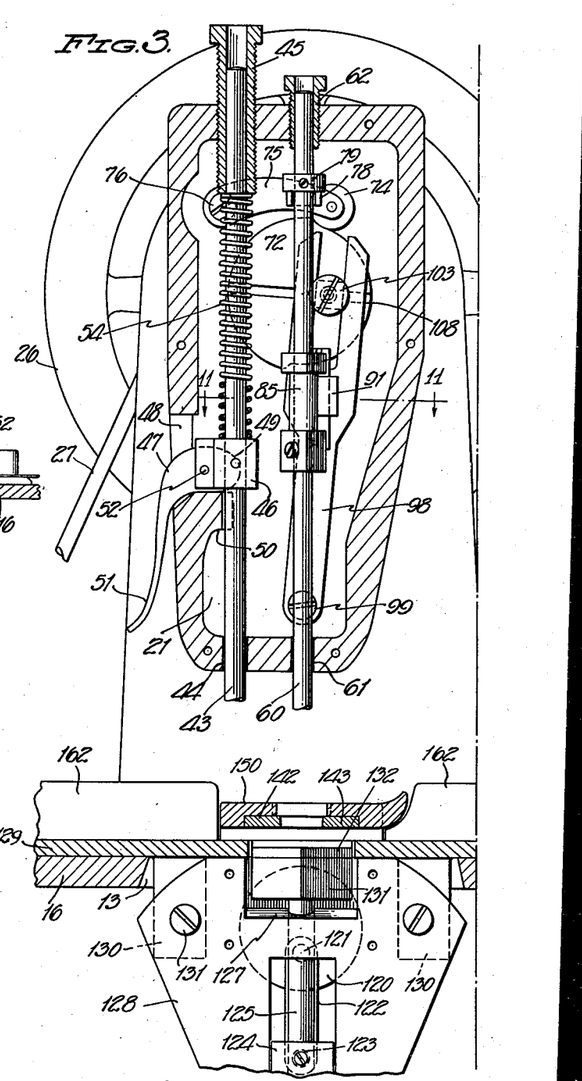
Figure 3 is a vertical sectional view on an enlarged scale, taken substantially on the line 3—3 of Figure 2.
Figure 5:
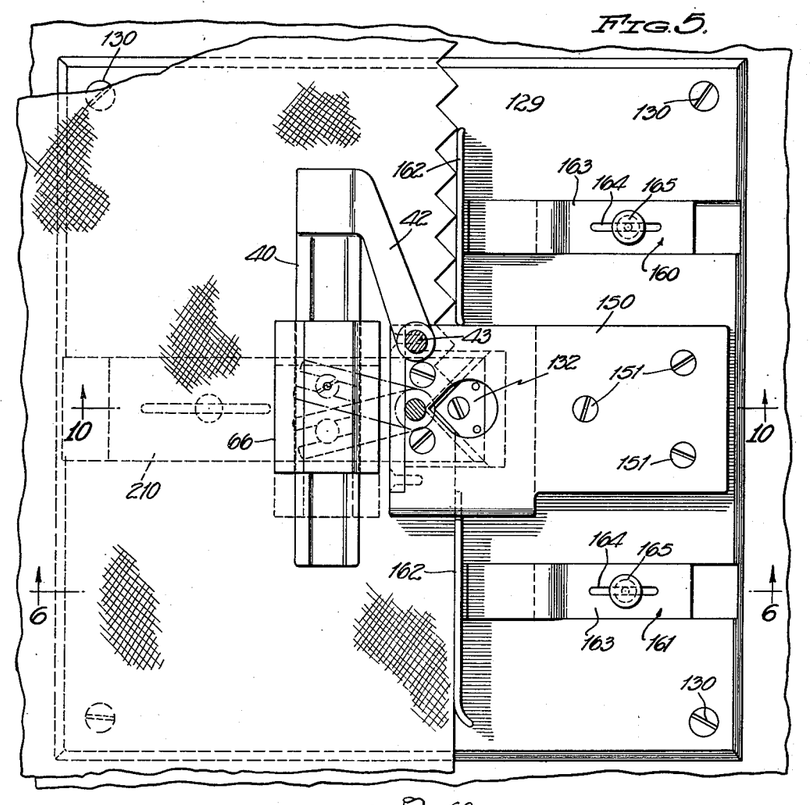
Figure 5 is a horizontal sectional view on an enlarged scale taken substantially on the line 5—5 of Figure 2.
Figure 6:
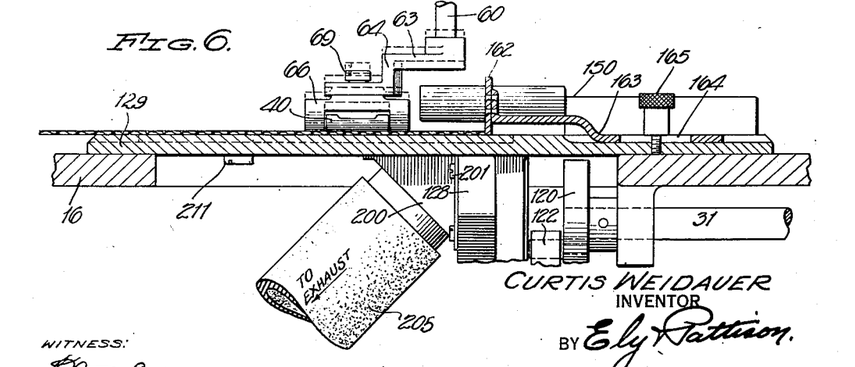
Figure 6 is a detail transverse sectional view taken substantially on the line 6—6 of Figure 5.
Figure 7:
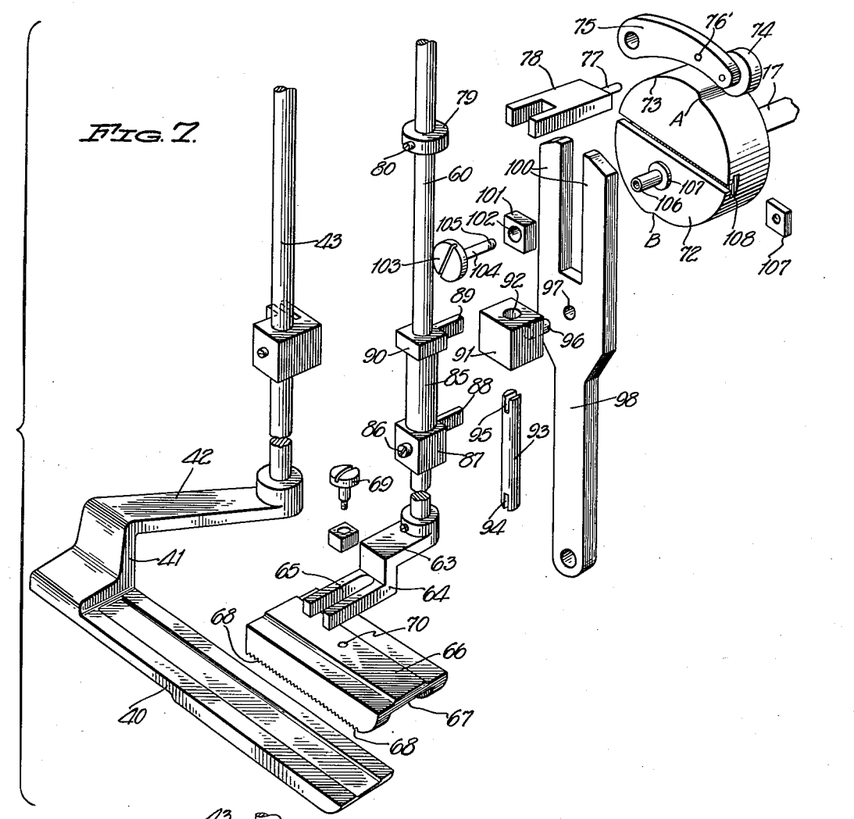
Figure 7 is a distended perspective view of the material holding and feeding mechanisms and their operating means.

The material holding means consists of an elongated presser foot or the like 40 which extends transversely of the work table or bench as more clearly illustrated in Figure 5. This presser foot 40, see Figure 7, comprises a relatively long narrow body portion carried by the offset portion 41 of an arm 42 which in turn is carried by the lower end of a vertical shaft 43. This shaft 43 passes through an opening 44 in the bottom wall of the housing 21, see Figure 3, its upper end being slidably mounted in a threaded sleeve 45 which has threaded engagement with the upper wall of the housing 21. Suitably carried by the shaft 43, there is a block 46 which provides the means for pivotally mounting a cam lever 47 upon said shaft. The cam lever 47 projects through an opening 48 in a side wall of the housing 21 with its nose portion 49 in position to engage the upper face of a lug 50 which projects inwardly of the housing 21 from the lower edge of the opening 48 as best illustrated in Figure 3. The outer end 51 of the cam lever 47 provides means for operating the lever to rock it about its pivotal point 52, which action, by reason of engagement of the nose 49 of the cam lever with the upper face of the lug 50, will effect a raising of the shaft 43 to elevate the presser foot carried thereby. A coil spring 54 surrounds the shaft 43 and is interposed between the lower end of the threaded sleeve 45 and the block 46 and this spring supplies the holding tension of the presser foot, which tension may be adjusted by the turning of the threaded sleeve in the threaded opening of the housing wall. By this construction, it will be obvious that when the cam lever is rocked upwardly from the position in which it is shown in Figure 3, the shaft 43 will be raised against the tension of the spring 54 and when said lever is again rocked downwardly, the coil spring 54 moves the presser foot into holding engagement with the material to be operated upon under that tension to which the coil spring 54 may be adjusted.

Also mounted for reciprocating movement in the housing 21, there is a shaft 60. This shaft 60 passes through an opening 61 in the lower wall of the housing 21, the upper end of the shaft 60 being slidably mounted in a bearing sleeve 62 threaded in an opening in the top wall of the housing 21. Secured to the lower end of the shaft 60, see Figure 7, there is an arm 63 which has an off-set extension 64 which is bifurcated as at 65. Carried by this bifurcated off-set extension 64, there is a material feeding element 66. The material feeding element 66 comprises an elongated member having a channel 67 extending longitudinally thereof which channel 67 is adapted to receive the presser foot when the material feeding element 66 is placed in straddling relation therewith. The flanges of the material feeding element are roughened to provide teeth or the like 68 for engagement with the material to be fed. The material feeding element is adjustably secured to the off-set extension 64 of the arm 63 by a bolt, cap screw or the like 69, the shank of which passes between the bifurcations of the off-set extension 64 and has threaded engagement in an opening 70 in the material feeding element.

Figure 10:
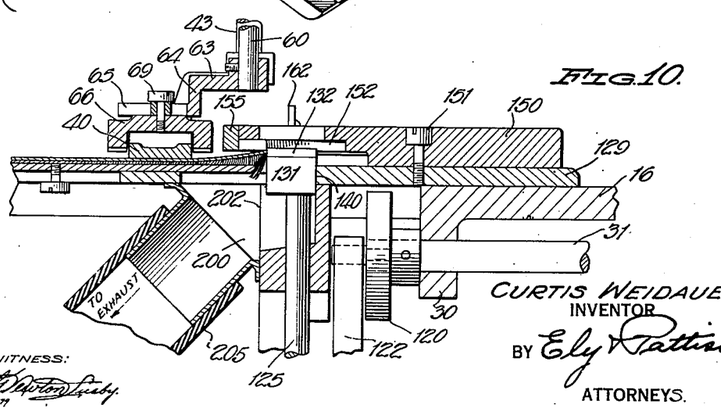
Figure 10 is a sectional view taken substantially on the line 10—10 of Figure 5.
Figure 11:
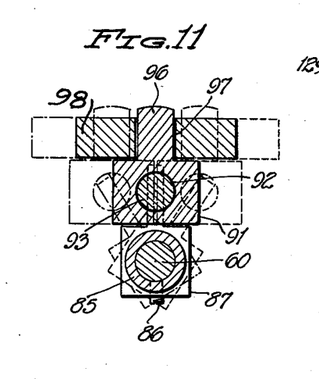
Figure 11 is a detail transverse sectional view on an enlarged scale taken substantially on the line 11—11 of Figure 3.

During operation of the machine, the material feeding element straddles the presser foot, as more clearly shown in Figure 10, and has reciprocating movement thereon, and I will now describe the mechanism by which this reciprocating movement is imparted to the material feeding element.

The forward end of the power shaft 17 is extended beyond the bearing 18 as at 71 and carried by this extended portion of the power shaft, there is a cam 72 which is secured to the shaft in such a manner as to rotate therewith when the shaft is driven. Upon its peripheral edge, the cam has a high zone 73 between the points designated A—B and as the cam member is rotated, and the high zone passes beneath the roller 74 carried by the free end of a pivoted lever 75, the lever will be rocked about the bolt or cap screw 76 by which it is mounted upon the rear wall of the housing 21 upon the interior thereof. The lever 75 has an opening 76' therein which receives the reduced extension 77 of a yoke member 78, the arms of which straddle the shaft 60 as best illustrated in Figure 3, of the drawings. The reference character 79 designates a collar which is adjustably secured upon the shaft 60 by a set screw or the like 80. The collar 80 is positioned upon the shaft 60 at a point above the yoke member, preferably just contacting the arms thereof so that as the pivoted lever 75 is rocked upwardly as the roller 74 rides the high portion 73 of the cam 72, the shaft 60 will be elevated, the shaft 60 moving downwardly as the roller rides the low portion of the cam 72. By this construction, it will be apparent that as the cam 72 is rotated as heretofore described, a vertical reciprocating movement will be imparted to the shaft 60 to raise and lower the material feeding element 66 out of and into engagement with the material being operated upon.

In addition to the vertical reciprocating motion imparted to the material feeding element 66, it is reciprocated in a horizontal plane, during which movements it slides upon the presser foot 40 as heretofore described.

The reciprocation of the material engaging element in a horizontal plane is accomplished by imparting an oscillatory movement to the shaft 60 and this is accomplished by a mechanism which will now be described.

Adjustably mounted upon the shaft 60, there is a sleeve 85. This sleeve is secured to the shaft 60 in its adjusted position thereon by a set screw 86 which is carried by an enlarged portion 87 upon the lower end of the sleeve 85. The set screw 86 also serves to operatively connect the sleeve 85, to the shaft 60 to provide for imparting movement thereto upon operation of the sleeve. Extending in a rearward direction from the enlarged portion 87, there is a rigid arm 88 which occupies a position in vertical alinement with a similar arm 89 extending in a rearward direction from an enlarged portion 90 upon the upper end of the sleeve 85.

The reference character 91 designates a block which has a passage 92 extending therethrough. Mounted in the passage 92 of the block 91, there is a relatively short shaft 93. This shaft 93 has its lower end bifurcated as at 94 to receive the rearwardly extending arm 88 of the block 87, the upper end of this shaft being similarly bifurcated as at 95 to receive the rearwardly extending arm 89 of the block 91. When the shaft 93 is in operative position as above described, the block 91 will be mounted between the arms 88 and 89 in such a manner as to have free rocking movement upon the shaft 93.

Extending rearwardly from the block 91, there is a pin 96 which is adapted to be received in a circular opening 97 in a bifurcated member 98. As best illustrated in Figure 3, the bifurcated member 98 is pivotally mounted as at 99 upon the rear wall of the housing 21 at a point near the bottom wall of said housing 21. The bifurcated member 98 is adapted to be rocked to and fro about its pivotal point 99 and the mechanism by which this motion is imparted thereto, will now be described.

The furcations of the bifurcated member 98 are designated 100 and mounted for sliding movement therebetween, there is a block 101 which has a passage 102 extending therethrough. The reference character 103 designates a screw, the shank 104 of which is threaded as at 105. The reference numeral 106 designates a sleeve which has a flanged end 107 which is adapted to engage the front face of the cam member 72. The sleeve 106 extends through the passage 102 in the block 101, after which the shank 104 of the screw 103 is passed through the sleeve 106. In this position, the thread 105 of the shank of the screw 103 engages a nut 107' which is movable for the purpose of adjustment, in a slot 108 in the front face of the cam member 72. When the screw 103 is tightened, the sleeve 106 constitutes a rigid driving pin which extends forwardly from the front face of the cam member 72 and which, upon rotation of the cam 72 serves to rock the bifurcated member 98 about its pivotal point 99. By positioning the nut 107 with relation to the axis of the cam 72, the throw of the bifurcated member 98 may be increased or decreased as desired.

From the foregoing description, it will be obvious that as the power shaft 17 is driven, the cam 72 will be rotated. Upon rotation of the cam 72, the shaft 60 will be reciprocated longitudinally or in a vertical plane by rocking of the lever 75 about its pivotal point, thereby moving the material feeding element into and out of engagement with the material being operated upon. In addition to the reciprocating motion imparted to the shaft 60, this shaft is oscillated about its longitudinal axis to feed the material being operated upon along the work table or bench in the presence of a cutting mechanism which will now be described.

Mounted upon the forward end of the shaft 31, there is a wheel or disk 120 upon the forward face of which there is a crank pin 121 and pivotally mounted upon this crank pin and depending therefrom, there is a link 122. The lower end of the link 122 is pivotally connected as at 123, to a collar 124 secured to a vertically disposed shaft 125. The shaft 125 is reciprocably mounted in bearings 126 and 127, which bearings are carried by a block-like member 128.

The reference character 129 designates a cover plate for the opening 13 in the work supporting table or bench, and the block-like bearing member is preferably secured to lugs 130 which depend from said cover plate by means of screws, bolts or the like as best illustrated in Figure 3.

Carried by the upper end of the shaft 125, there is a cutter head 131 and mounted thereon there is a cutting knife 132. The cutting knife 132 is hereinafter illustrated as of triangular form, but it is to be understood that it may be of curved form if a pinked edge of curved form is desired. The knife 132 is provided with an opening 133 for the reception of a bolt or screw 134 which has threaded engagement with an opening 135 in the cutter head to secure the knife 132 to the cutter head 131. Projecting from the top face of the cutter head 131, there are two pins 136 which are received in openings 137 in the knife to prevent movement thereof relatively to the cutter head 131. The two edges 138 constitute the cutting edges of the knife, and by reference to Figure 9 of the drawings, it will be apparent that the sides of the knife upon which these cutting edges are formed, are undercut as indicated by the reference character 139.

From the foregoing, it will be readily apparent that as the shaft 31 is rotated, the shaft 125 will be reciprocated longitudinally, moving the cutter head and knife vertically through an opening 140 in the cover plate 129, see Figure 10.

Figure 9:
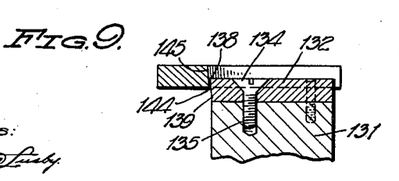
Figure 9 is a detail sectional view on an enlarged scale, illustrating the cutter elements.

In its reciprocating movement, the knife 132 cooperates with a second knife to perform the actual cutting operation. The second knife consists of two elements 142 and 143, each of which has an angular cutting edge 144. As shown in Figure 9, the edges of the knives upon which the cutting edges 144 are formed, recede from the actual cutting edge as indicated at 145, in a direction opposite to that of the undercut 139 of the cutting edges 138 of the knife 132. This construction of knives, gives immediate clearance of their cutting edges and insures clean and accurate cutting of the material being operated upon. It is to be noted, that the upper knife, is formed in two sections and this I consider important since it permits of separate grinding of the cutting edges of these sections to conform exactly to their respective edges of the knife 132 thereby to provide more accurate matching of the cutting edges and consequently a cleaner cutting action results.

The upper knife is carried by a plate 150 which is secured to the cover plate 129 as at 151.

As best illustrated in Figure 10, this plate 150 is undercut as at 152 to receive the knife sections 142 and 143 which may be secured in position by bolts or screws which pass through openings 153 in the plate 150 and have threaded engagement in openings 154 in the knife sections. After the knife sections have been positioned upon the plate 150, an end block 155 is secured to the end of the plate 150 by screws or bolts which pass through openings 156 in the end block and have threaded engagement with recesses 157 in the end of the plate 150.

By reference to Figure 10, it will be apparent that the upper knife is supported above the cover plate 129 and that as the knife 132 is reciprocated in the manner heretofore described, it engages the under side of the material operated upon, elevates the material and carries it into cutting engagement with the upper knife to perform the cutting operation. After the cutting operation has been completed, the knife 132 recedes and the material is fed forwardly by the material feeding mechanism in the manner heretofore described.

The so-called pinked edge consists of a row of alternating notches and triangular projections which form a zig-zag or serrated edge, the slopes of the projections and notches being preferably straight so as to form sharp angles at the junction between oppositely trending slopes and adjacent slopes of said projections. Such an edge is illustrated above the cutting mechanism in Figure 5 of the drawings.

Provision is made whereby the length of the notches and consequently the length of the projections may be varied as desired and I will now describe the construction by which this result is obtained.

As the material is passed in the presence of the cutting mechanism that edge thereof which is being operated upon is guided and maintained in definite relation to the cutting mechanism by a suitable guiding means herein illustrated as two separate and independently adjustable guides 160 and 161.

Each of these guides includes an upstanding wall 162 from which extends an arm 163. Each arm is slotted as at 164 to receive a bolt 165 which has threaded engagement with the cover plate 129 to clamp the guides thereto in their adjusted position.

By reference to Figure 5, it will be obvious that if the guides 160 and 161 are adjusted to the right in said figure to a position beyond that in which they are shown, the cut of the cutting mechanism will be longer and consequently the notches and projections will also be longer than shown in said figure. On the other hand, if these guides were adjusted to the left in said figure, the resulting notches would be shorter than shown therein.

In order that the pinked edge may be continuous, or uninterrupted, the feeding of the material must bear a definite relation to the length of the cut. For example, if the cut is of the maximum length, the material operated upon must be fed both at a greater speed and at intermittent distances of greater length than is the case where the length of cut is less than maximum.

In the drawings, the several parts are illustrated in substantially their proper position to produce a pinked edge such as illustrated in Figure 5. If it be desired to cut a pinked edge in which the notches are longer and consequently the projections longer than those shown, the guides 160 and 161 would be adjusted towards the right in Figure 5 and thus permit the material being operated upon to extend further into the cutting zone or in other words, to overlie to a greater extent, the cutting knives. In this adjusted position the portions removed would be larger than would be the case with the guides in the position in which they are illustrated in Figure 5 and consequently the notches will be longer and the projections longer than those shown.

On the other hand, if the guides 160 and 161 be adjusted to the left in Figure 5, a relatively smaller portion of the material being operated upon would overlie the cutting knives and the resultant notches would be shorter and the projections shorter than illustrated in Figure 5.

In any adjustment of the guides, however, a perfect pinked edge results and this is accomplished by an adjustment of both the speed of operation and the distance of travel of the feeding element 66. For example, when the guides 160 and 161 are adjusted to form relatively long notches and long projections, the intermittent operation of the feeding element must be speeded up and its distance of movement with each feeding operation increased. This is acccomplished by adjustment of the screw 103 and the nut 101, radially outwardly of the cam 72. Such an adjustment, increases the throw of the bifurcated member 98, consequently increasing the length of the arcuate path of travel of the bifurcated arm 63 and thereby increasing the extent of movement imparted to the feeding element 66. Obviously, adjustment of the screw 103 and nut 107' radially inwardly of the cam 72, reduces both the extent of throw and speed of operation of the several parts and adapts the feeding mechanism to the cutting of relatively short notches and short projections.

Figure 1:
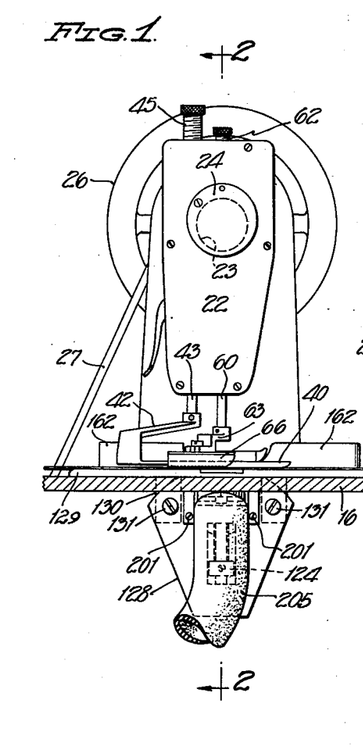
Figure 1 is an end view in elevation and partly in section illustrating a machine constructed in accordance with the present invention.
Figures 2, 4:
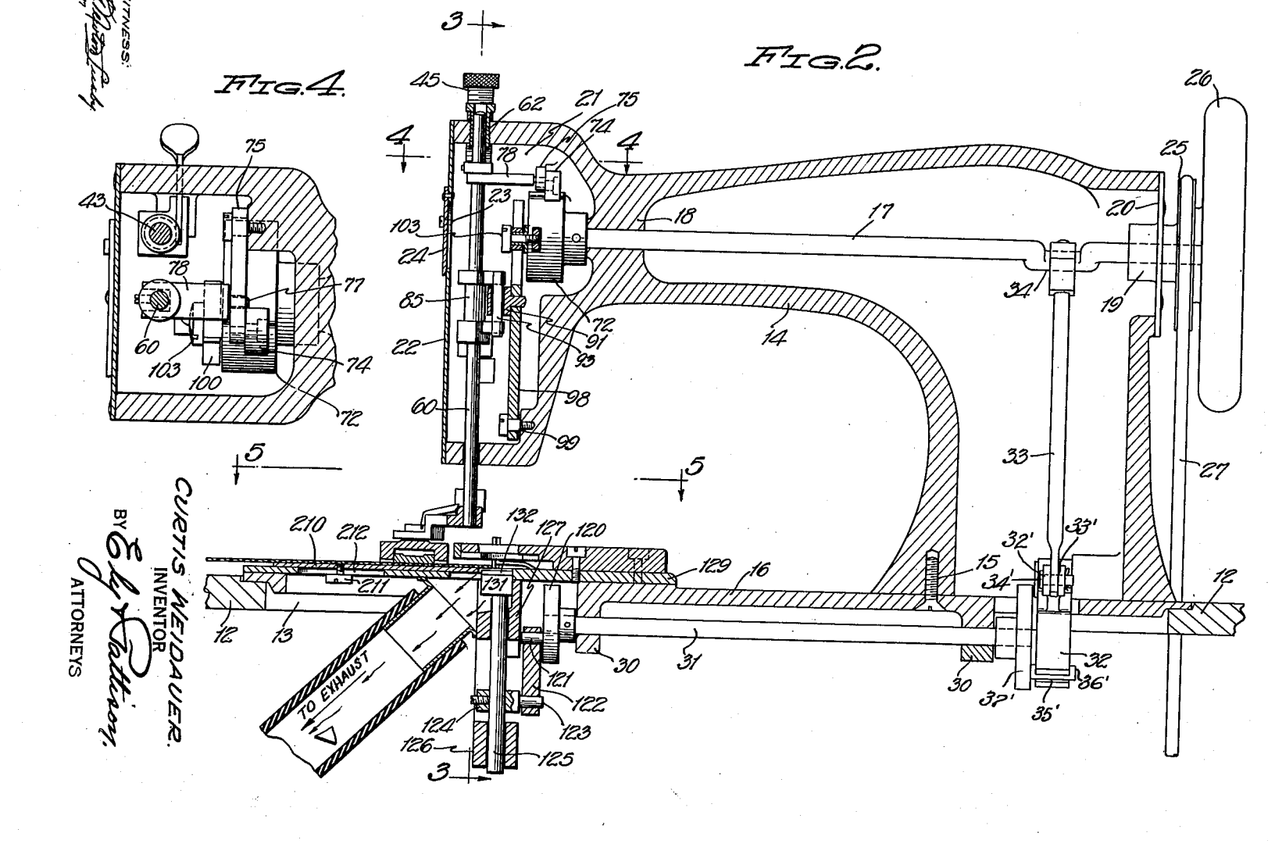
Figure 2 is a vertical longitudinal sectional view through the head and table of the machine, the view being on an enlarged scale.
Figure 4 is a detail horizontal sectional view on an enlarged scale, the view being taken substantially on the line 4—4 of Figure 2.

Means is provided to convey away from the cutting zone, the pieces of material removed by the cutting knives and this means includes a housing 200, secured to the block-like member 128 by screws 201 as shown in Figure 1. The block-like member 128 is cut out as at 202 in order that the interior of the housing 200 may have uninterrupted communication with the cutting zone. A suitable pneumatic conveyor 205 leads from the housing 200 to a suitable exhausting mechanism not shown but which is designed to draw air and severed portions of material from the cutting zone.

As illustrated in Figure 10, this exhausting mechanism also performs the function of drawing the hair of a fur skin out of the actual cutting path of the knives at the left hand side thereof in the drawings and thus provides for the cutting of this type of material without damage to the hair thereof by cutting only the skin.

Figure 8:
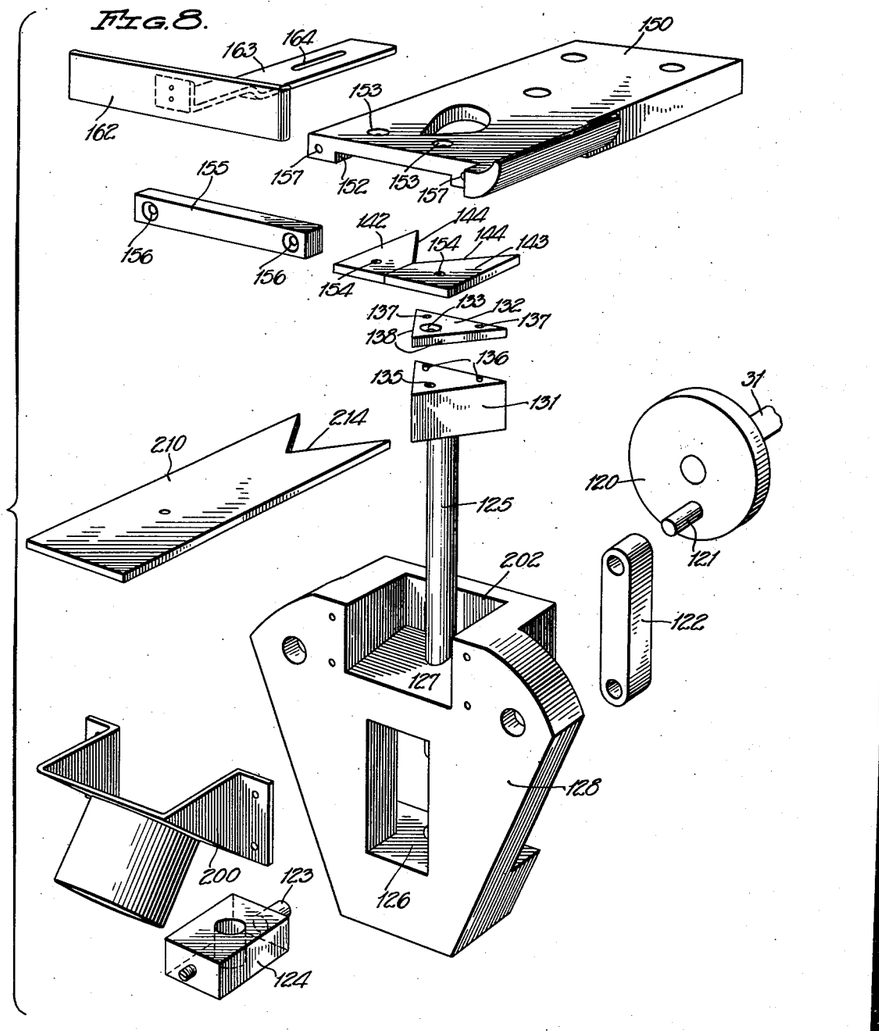
Figure 8 is a distended perspective view of the cutter mechanism.

The reference numeral 210 designates a plate which is adjustably mounted upon the cover plate 129 by a screw or the like 211 which passes through an elongated slot 212 in the cover plate 129 and which has threaded engagement with the plate 210. As best illustrated in Figure 8, this plate 210 has a V-shaped notch 214 formed in that end which is adjacent the cutting knives. The V-shaped notch 214 straddles the cutting head 131 and may be adjusted relatively thereto in order to vary the extent of exhaust action produced at the cutting zone. By this adjustment, the machine is adaptable to cutting materials of various weights and thicknesses as well as skins with various types of hair or fur.

In the present illustrations of the invention, no particular source of power has been shown and it is to be understood that the machine may be operated in any desired manner.

It is to be further understood, that during operation of the machine, the material operated upon is fed through the machine automatically in intermittent steps in a manner similar to the feeding of material through a conventional sewing machine and that the material is automatically positioned relatively to the cutting knives by the feeding mechanism.

From the foregoing, it will be apparent that the present invention provides a new and improved machine for producing the pinked edge upon materials of all types and that the machine is highly efficient and rapid in operation. Furthermore, the invention provides for variation in the length of notches and length of projections of the pinked edge and at the same time, maintaining the true contour of said edge.

While the invention has been herein illustrated in its preferred form, it is to be understood that it is not to be limited to the specific details of construction herein shown and that it may be practiced in such other forms as rightfully fall within the scope of the appended claims.

Having thus described the invention what is claimed as new, is:

1. In a pinking machine, a table or bench over which the material to be operated upon is adapted to be fed, a cutting mechanism, and means for feeding a piece of material to be operated upon relatively to the cutting mechanism, said feeding means including a holding foot for engagement with the material, means carried by the holding foot for engagement with the material being operated upon to move the same relatively to the holding foot, and means for imparting reciprocating motion to the material engaging means.

2. In a pinking machine in combination, a table or bench over which the material to be operated upon is adapted to be fed, a plurality of cooperating cutters, means for moving said cutters intermittently into cutting relation, and means for feeding a piece of material to be operated upon relatively to said cutters, said feeding means including a holding foot for yielding engagement with the material, means carried by the holding foot for engagement with the material being operated upon to move the same relatively to the holding foot and aforementioned cooperating cutters, and means for imparting reciprocating motion to the material engaging means in timed relation to said cooperating cutters.

3. In a pinking machine for operating upon fur skins and similar materials, a table or bench over which the material to be operated upon is adapted to be fed, a fixed knife above the table or bench, a second knife below the table or bench and movable through an opening therein into cutting relation with the stationary knife, and pneumatic means operable through the knife opening in the table or bench for drawing the hair of a skin being operated upon out of the path of the knives prior to and during the cutting operation thereof.

4. In a pinking machine for operating upon fur skins and similar materials, a table or bench over which the material to be operated upon is adapted to be fed, a fixed knife above the table or bench, a second knife below the table or bench and movable through an opening therein into cutting relation with the fixed knife, a housing mounted beneath the table or bench and having communication with the cutting zone of the knives through the opening in the table or bench through which the movable knife passes into cutting relation with the fixed knife, and means for drawing air through the cutting zone of the knives and through the housing whereby to draw the hair of a skin being operated upon to one side of the knives and out of the cutting zone thereof.

5. In a pinking machine in combination, a table or bench over which the material to be operated upon is adapted to be fed, a cutting mechanism, and means for feeding a piece of material to be operated upon relatively to the cutting mechanism, said feeding means including a holding foot for engagement with the material, means carried by the holding foot for engagement with the material to move the same relatively to the holding foot, a rotatable cam, means for rotating said cam, means operated by the cam for alternately moving the material moving means into and out of engagement with the material, and means for imparting reciprocating motion to the material engaging means.

6. In a pinking machine in combination, a table or bench over which the material to be operated upon is adapted to be fed, a cutting mechanism, and means for feeding a piece of material to be operated upon relatively to the cutting mechanism, said feeding means including a holding foot for engagement with the material, means carried by the holding foot for engagement with the material to move the same relatively to the holding foot, a rotatable cam, means for rotating said cam, means operated by the cam for alternately moving the material moving means into and out of engagement with the material, and means for imparting reciprocating motion to the material engaging means, said last mentioned means being operated from said aforementioned cam.

7. In a pinking machine in combination, a table or bench over which the material to be operated upon is adapted to be fed, a cutting mechanism, and means for feeding a piece of material to be operated upon relatively to the cutting mechanism, said feeding means including a holding foot for engagement with the material, means carried by the holding foot for engagement with the material to move the same relatively to the holding foot, a rotatable cam, an eccentric pin carried by the forward face of said cam, means for rotating said cam, means operated by the cam for alternately moving the material moving means into and out of engagement with the material, and means operated by the aforementioned eccentric pin carried by the cam for imparting reciprocating motion to the material feeding means.

8. In a pinking machine in combination, a table or bench over which the material to be operated upon is adapted to be fed, a cutting mechanism, and means for feeding a piece of material to be operated upon relatively to the cutting mechanism, said feeding means including a holding foot for engagement with the material, means carried by the holding foot for engagement with the material to move the same relatively to the holding foot, a rotatable cam, an eccentric pin carried by the forward face of said cam, means for rotating said cam, means operated by the cam for alternately moving the material moving means into and out of engagement with the material, means operated by the aforementioned eccentric pin carried by the cam for imparting reciprocating motion to the material feeding means, and means for adjusting said eccentric pin relatively to the axis of said cam to vary the extent of reciprocating motion imparted to the material engaging means.

CURTIS WEIDAUER.